Sept. 11, 1962

W. R. E. HENSEL 3,053,117

PLANETARY GEAR TRANSMISSION

Filed June 22, 1959

INVENTOR.
WERNER R. E. HENSEL

BY
Dicke, Craig and Freudenberg
ATTORNEYS

# United States Patent Office 3,053,117
Patented Sept. 11, 1962

3,053,117
PLANETARY GEAR TRANSMISSION
Werner R. E. Hensel, Fellbach, near Stuttgart, Germany, assignor to Daimler-Benz Aktiengesellschaft, Stuttgart, Germany
Filed June 22, 1959, Ser. No. 822,040
16 Claims. (Cl. 74—763)

The present invention relates to a change-speed transmission including planetary gear sets, especially to an automatically shifted motor vehicle change-speed transmission in combination with a hydrodynamic unit of the type disclosed in the copending application Serial No. 625,827, now abandoned filed December 3, 1956 and entitled "Planetary Gear Transmission."

It is known in the prior art, especially for so-called hydraulic transmission in motor vehicles, to use planetary gears which are generally combined into a structural unit connected behind the hydrodynamic section of the transmission. It is thereby desirable to provide a transmission which may be constructed in a compact and simple manner, the load requirements and stresses of which are as favorable as possible, for example, as regards forces or pressures at the gears, and which provides with few shifting members or shifting operations a sufficiently large number of speeds.

The present invention is concerned with such a transmission.

The aims set forth hereinabove are solved in accordance with the present invention by providing a transmission of the type mentioned hereinabove in which the sun gears of two planetary gear sets are connected with each other by means of a common carrier or support member which, in turn, is operatively connected by means of a radial disk disposed between both planetary gear sets with an outer drum-shaped member and by arranging two engageable devices on this outer drum-shaped member for purposes of selectively connecting both sun gears with either a relatively stationary transmission part or with the input or driving member of the transmission.

Accordingly, the present invention consists essentially of a transmission of the type described in the aforementioned copending application in which two planetary gear sets are arranged between the input or drive shaft and the output or driven shaft of the transmission in such a manner that a two-path drive may take place by the use of a common input or drive connection, i.e., the drive may take place simultaneously partly over the one and partly over the other planetary gear, and that at least one of the two planetary gears is additionally adapted to be operatively connected with the drive shaft apart from the common input or drive connection with both planetary gear sets so that two selectively engageable drive connections may be obtained with one of the two planetary gears while the other planetary gear is directly affected only by the engagement of the common one of the two selectively engageable drive connections and not by the additional one.

Upon simultaneous engagement of the common and of the additional drive connection by the simultaneous engagement of the respective clutches, a locking of the planetary gear adapted to be connected with both the common and additional drive connection is effectuated thereby and therewith a direct or 1:1 drive through this planetary gear set.

For purposes of obtaining further transmission ratios, the common input or output drive connection of the transmission is adapted to be braked so that the drive, with an idling second planetary gear set, takes places over the planetary gear which is driven exclusively over the additional drive connection and which rotatingly supports itself at the common braked drive shaft of the transmission, i.e., rotates about the common stationary element of the transmission to provide the desired transmission ratio.

Furthermore, for purposes of obtaining a reverse speed, the one transmission member of the planetary gear set which is driven exclusively over the common input or drive connection is adapted to be braked.

In connection with the details of one specific construction according to the present invention, the planetary gear carrier of the gear set adjacent to the output or driven member may be connected with an outer drum-shaped member by means of a radial disk-like member disposed between the two gear sets, and an engageable device may be arranged on this drum-shaped member for the selective connection with a relatively stationary transmission part. This drum-shaped member extends appropriately in the axial direction thereof in such a manner above the planetary gear set that the latter is disposed concentrically within this drum-shaped member. Furthermore, the outer drum-shaped member connected to the sun gear carrier may extend from the radial disk-like member connected therewith in the axial direction toward both sides thereof above and beyond both planetary gear sets or above the drum-shaped member of the planetary gear carrier in such a manner that both planetary gear sets or that the drum-shaped member of the planet carrier is disposed at least partly concentrically within the outer drum-shaped member at the sun gear carrier. By the use of such a construction, the two engageable devices provided for purposes of connection with the relatively stationary transmission housing may be advantageously arranged at both ends of the two drum-shaped members directly adjacent to each other and in a mirror image-like manner with respect to each other in such a manner that the actuating members thereof, for example, the hydraulic actuating pistons, are disposed outwardly thereof as seen in the axial direction thereof.

The construction according to the present invention provides a very compact design, especially a very short structural unit or block, which may be used advantageously for example, as a truck change-speed transmission by reason of its particularly favorable properties and characteristics. By reason of the particular arrangement and location of the engageable devices in accordance with the present invention, the only loads which result within the transmission are moments while the transmission shaft is thereby relieved of any bending moments.

As will become more clear from the following description of the present invention, very favorable pressure forces and stresses at the gears as well as shifting possibilities are obtained by a change-speed transmission in accordance with the present invention.

In the transmission according to the present invention, the annular or ring gear of the planetary gear set adjacent the input or driving member may be adapted to be connected with the driving or input member by means of a further clutch. The clutches used for purposes of connecting the drive or input member with the ring gear of the next adjacent planetary gear set and with the sun gears are appropriately so constructed that they may be selectively engaged or may be engaged simultaneously.

In one embodiment according to the present invention, the engageable device serving for purposes of connecting the ring gear of the first planetary gear set with the driving member is constructed differently from the three other engageable devices which are identical with each other, and, more particularly, is constructed as a single disk friction clutch. A driving, drum-shaped member may thereby be provided with a disk member extending radially inwardly whereby the clutch for purposes of connection with the sun gears is arranged on one side of this disk member, whereas the clutch for purposes of connection with the ring gear is arranged on the opposite side thereof.

According to another construction of the present invention, the ring gear of the planetary gear set adjacent the input member may be provided with a drum-shaped member for accommodating thereon the clutch and this drum-shaped member may be arranged at least partly within the outer drum-shaped member operatively connected with the sun gear carrier. In this manner, both clutches adapted to provide a selective connection with the input member may be arranged at the ends of both drum-shaped members directly adjacent one another and mirror imagelike with respect to each other within an input or driving drum-shaped member in such a manner that the actuating members thereof, for example, the hydraulic actuating pistons, are located on the outside thereof as seen in the axial direction.

This last described embodiment further distinguishes itself by the fact that all engageable devices are constructed as friction disk devices and are composed of the same structural elements. As a further simplification, annularly constructed actuating members, for example, hydraulic actuating pistons, may be provided for the rotating parts of the engageable devices adapted to be connected with the driving member as well as for the stationary parts of the engageable devices adapted to be connected with the transmission housing.

The overall construction of such a transmission is essentially symmetrical to a plane perpendicular to the axis of the transmission and disposed between the two planetary gear sets.

The construction in accordance with the present invention makes it possible to utilize to a large extent identical structural parts so that the manufacture and assembly thereof as well as particularly spare parts requirements therefor are made less expensive.

Accordingly, it is an object of the present invention to provide a change-speed transmission which offers particularly favorable conditions as regards loading of the individual gear elements, as regards spatial requirements and as regards weight thereof.

A still further object of the present invention is the provision of a change-speed transmission which is compact yet offers great versatility in its operation combined with great simplicity in the construction thereof as well as in the mode of shifting thereof.

Still another object of the present invention is the provision of a change-speed transmission in which the maximum loads and stresses on the individual gear wheels or elements of the transmission are minimized, especially in that speed or speeds in which maximum torque requirements are expected from the transmission.

A still further object of the present invention is to provide a simple compact speed-change transmission which includes two planetary gears effectively connected in parallel with one another and a plurality of actuating devices for effecting the various speeds.

Still another object of the present invention is to provide a compact change-speed transmission consisting of two planetary gear sets in which a two-path transmission of torque is obtained in a certain speed or speeds so as to minimize the stresses on the individual gears.

A further object of the present invention resides in the provision of a three-speed transmission which is very simple in construction, requires few actuating elements and enables the obtainment of a reverse speed in an extremely simple manner.

It is a further object of the present invention to provide a change-speed transmission which is versatile in offering a sufficient number of speeds while at the same time enabling an extremely simple shifting of the transmission and which is also simple in construction, compact in dimensions and which utilizes a relatively small number of different parts, particularly in the control and actuating systems thereof.

Still another object of the present invention resides in the provision of a change-speed transmission providing a plurality of speeds in which a minimum number of actuating parts are required.

A further object of the present invention is the provision of a change-speed transmission which is relatively inexpensive in the manufacture and assembly thereof, and which minimizes the requirement for stocking a large number of spare parts.

Another object of the present invention resides in the provision of a planetary-gear-set change-speed transmission of the type mentioned hereinabove in which essentially only moments occur as loads and in which the shafts are relieved of any bending moments, while at the same time offering also all of the advantages mentioned hereinabove.

Further objects, features and advantages of the present invention will become more obvious from the following description when taken in connection with the accompanying drawing which shows, for purposes of illustration only, several embodiments in accordance with the present invention, and wherein.

Figure 1:
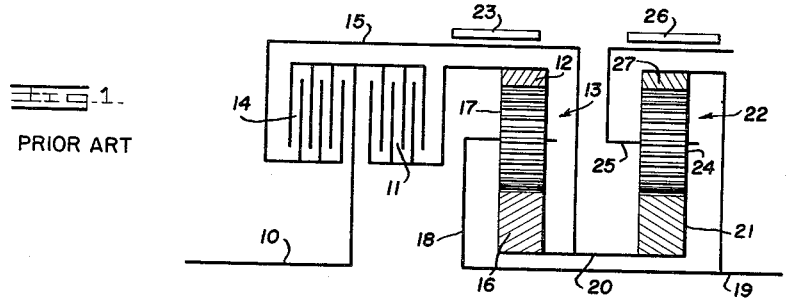
FIGURE 1 is a schematic view of the overall arrangement of a change-speed transmission provided with two planetary gear sets and offering three forward and one reverse speed as described in the aforementioned copending application.

Referring now to FIGURE 1 of the drawing, which illustrates schematically a half cross-sectional view through the transmission disclosed in the copending application S.N. 625,827 and which is described and illustrated herein only as an aid for a better understanding and appreciation of the present invention, reference numeral 10 desigates the drive shaft or input shaft which, for example, may be the crankshaft or flywheel shaft of a motor vehicle engine. The input or drive shaft 10 is adapted to be connected, on the one hand, by means of clutch 11 with the outer ring gear 12 of the first planetary gear set 13, and, on the other, by means of clutch 14, rotary drum-shaped member 15 and hollow shaft 20 with the sun gear 16 of the first planetary gear set 13 and with the sun gear 21 of the second planetary gear set 22.

The first planetary gear set 13 further comprises one or preferably several planet gears 17 which are in simultaneous meshing engagement with both the ring gear 12 and the sun gear 16 thereof. The planet gears 17 are rotatably supported on a planet carrier 18 which is connected for common rotation with the output or driven shaft 19 leading, for example, to the vehicle wheels.

The sun gear 16 is thereby operatively connected or suitably secured for common rotation with the hollow shaft 20, and by means of which it is thereby also connected for common rotation with the rotary drum-shaped member 15 and with the sun gear 21 of the second planetary gear set 22 so that both sun gears 16 and 21 are effectively interconnected for common rotation by the hollow shaft 20, both sun gears 16 and 21 thereby rotating at the same speed as the drum 15.

The sun gear 21 of the second planetary gear set 22 is in meshing engagement with one or preferably several planet gears 24. The planet gears 24 are rotatably supported on a planet carrier 25.

The hollow shaft 20 and therewith the sun gears 16 and 21 of the first and second planetary gear sets 13 and 22 together with the drum 15 are adapted to be braked against a relatively stationary part of the transmission, such as the housing thereof, by means of a brake 23 of any suitable construction, such as a friction band brake or the like so as to hold the sun gears 16 and 21 at the speed of the relatively stationary transmission part.

The planet carrier 25 of the second planetary gear 22 is also adapted to be braked against the relative stationary transmission part, such as the transmission housing, by means of a brake 26 of any suitable construction such as a friction band brake or the like. The ring gear 27 of the second planetary gear 22 which is in meshing engagement with the planet gears 24 thereof is connected for common rotation with the driven or output shaft 19 by means of a suitable drive connection so that the ring gear 27 of the second planetary gear 22 at all times rotates at the same speed as the driven or output shaft 19 and therewith also at the same speed as the planet carrier 18 of the first planetary gear set 13.

OPERATION

The general mode of shifting of the change-speed transmission illustrated in FIGURE 1 of the drawing is as follows:

First Speed

In first speed, on the one hand, the clutch 11 is engaged and therewith the drive shaft or input shaft 10 is connected with the ring gear 12 of the first planetary gear set 13, whereas the clutch 14 and the brake 23 are disengaged; on the other hand, the planet carrier 25 of the second planetary gear set 22 is kept relatively stationary by engagement of the brake 26.

As a result of the engagement of clutch 11 and brake 26 and of the disengagement of clutch 14 and brake 23, a two-path or division of the transmission of driving power takes place in that a part of the driving power is transmitted directly from the first planetary gear set 13 over the planet carrier 18 to the driven or output shaft 19 and another part of the driving power over the sun gear 16 of the first planetary gear 13 and the second planetary gear set 22 to the driven shaft 19. This division of driving power assures that the load and stresses on the individual gear wheels in the first speed, in which the transmission operates with a particularly large step-down transmission ratio and with a particularly large transmission of torque, is essentially the same on all gear wheels and is no larger than that which takes place in the second speed.

Second Speed

In the second speed in which the clutch 14 remains disengaged and the clutch 11 remains engaged, the brake 23 is engaged. Consequently the drive takes place exclusively over the clutch 11 and the first planetary gear set 13 since the planet carrier 18 and therewith the driven shaft 19 are thereby driven by the ring gear 12 while the planet gears 17 rotatingly support themselves at the braked stationary sun gear 16, i.e., the planet gears 17 rotate about the stationary sun gear 16 thereby effecting rotation of planet carrier 18 at a step-down transmission ratio to a slower speed, which, however, is a lesser step-down transmission ratio than in the first speed. The second planetary gear set 22 thereby idles with the brake 26 disengaged by rotatingly supporting itself at the stationary sun gear 21, i.e., by rotating about the stationary sun gear 21.

Third of Direct Speed

For purposes of engaging the third or direct speed, the clutches 11 and 14 are engaged simultaneously so that the planetary gear set 13 is locked in itself and thereby rotates as a unit, and therewith drives the driven or output shaft 19 at a one-to-one speed ratio. The second planetary gear set 22 is thereby also locked in itself with the brake 26 disengaged.

Reverse Speed

For purposes of obtaining a reverse speed, the clutch 11 is disengaged and the clutch 14 engaged. The brake 23 is also disengaged while the brake 26 is engaged so that the ring gear 27 and therewith the driven shaft 19 rotate in a direction opposite to the driven sun gear 21 or the drive shaft 10 operatively connected therewith. The first planetary gear set 13 thereby idles by the ensuing rotating support of the planet gears 17 thereof at the driven sun gear 16, whereas the second planetary gear set 22 provides both the step-down transmission ratio as well as the reversal of the direction of rotation whereby the forces at the gear wheels are greater by the factor of the transmission ratio than in the forward speeds. However, since the reverse speed is only used occasionally the larger forces occurring at the gear wheels may be readily accepted or tolerated.

The shifting chart of the transmission illustrated in FIGURE 1 for the various speeds thereof is as follows:

| Speed | Clutch 11 | Clutch 14 | Brake 23 | Brake 26 |
|---|---|---|---|---|
| First | engaged | disengaged | disengaged | engaged. |
| Second | do | do | engaged | disengaged. |
| Third or direct | do | engaged | disengaged | Do. |
| Reverse | disengaged | do | do | engaged. |

In the first and reverse speeds the brake 23 may be used as transmission brake, in the second speed the brake 26, and in the third speed either or both brakes 23 and 26 may be used as transmission brake.

Figure 2:
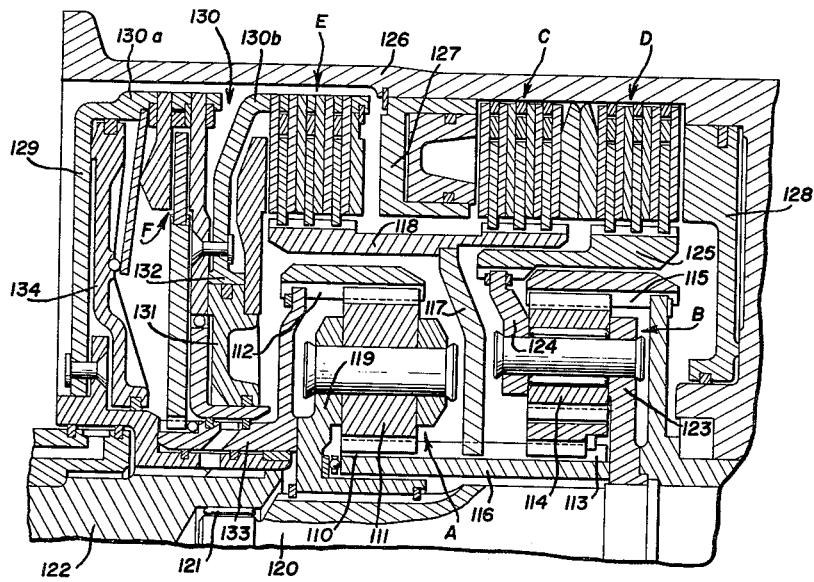
FIGURE 2 is an axial longitudinal cross-sectional view through one embodiment of a change-speed transmission in accordance with the present invention illustrating the structural improvements over the schematically illustrated transmission of FIGURE 1.

Referring now to FIGURE 2, which illustrates the structural improvements of a change-speed transmission in accordance with the present invention, the transmission again includes two planetary gear sets generally designated by A and B which may provide either the same or different transmission ratios. The former solution offers advantages as regards simplicity of manufacture by reason of the use of similar parts, particularly insofar as the gears are concerned. Furthermore, in that case, the sun gears are not subjected to any thrust in at least one speed thereof. The latter solution, however, offers greater freedom as regards the choice and selection of the particular transmission ratios for the various speeds thereof.

The planetary gear set A again includes a sun gear 110, one or several planetary gears 111 and a ring gear 112. The second planetary gear set B also includes, in a similar manner, a sun gear 113, one or several planetary gears 114 and a ring gear 115.

Both sun gears 110 and 113 are rigidly connected with each other by means of a sleeve portion 116. A radial disk member 117 or a similar support member extends radially outwardly from sleeve 116 between the two planetary gear sets A and B and is provided at the outer periphery thereof with a drum-shaped member 118. The drum-shaped member 118 extends as symmetrically as possible in the axial direction from the disk member 117 toward both sides thereof as seen in the axial direction so that the two planetary gear sets A and B are disposed either entirely or partly concentrically within the drum-shaped member 118.

The planet carrier 119 of the planetary gear set A is operatively connected with the driven shaft 120 in any suitable manner, for example, by means of a splined connection. The ring gear 115 of the second planetary gear set B is also connected with driven shaft 120 in any suitable manner so as to rotate in unison therewith. The driven or output shaft 120 is rotatably supported by means of bearing 121 within the input or driving shaft 122. The planet carrier 123 of the second planetary gear set B is operatively connected with a drum-shaped member 125 by means of a radial disk member 124 or an annular support member disposed between the two planetary gear sets A and B to rotate in unison therewith.

The drum-shaped member 125 extends axially beyond the planetary gear set B, i.e., axially toward the right beyond planetary gear set B, as viewed in FIGURE 2, so that the latter is disposed concentrically therewithin. The drum-shaped member 125 is disposed, in turn, partly within the drum-shaped member 118 of the support member or carrier 117 for the two sun gears 110 and 113.

Two engageable devices generally designated by C and D are arranged at the right ends of both drum-shaped members 118 and 125, which engageable devices C and D may be constructed, for example, as friction disk brakes and may be composed of identical structural parts. The brakes C and D serve for purposes of connecting the sun-gear carrier 117 and therewith the sun gears 110 and 113 and the planet carrier 123, 124 of the gear set B respectively with the relatively stationary transmission housing 126 so as to selectively brake the sun gears 110 and 113 and the planet carrier 123, 124. Both brakes C and D may be arranged directly adjacent to one another and may be disposed mirror image-like to each other. For purposes of actuation of the brakes C and D, hydraulic pistons 127 and 128 or any other suitable actuating members may be provided which act against the brakes C and D in the axial direction and from the outside thereof as seen in the axial direction.

An outer drum-shaped member generally designated by reference numeral 130 which in the embodiment of FIGURE 2 is made of two parts 130a and 130b is operatively connected with the driving shaft 122 by means of a radial disk member 129. Both parts 130a and 130b of the drum-shaped member are disposed radially outwardly of drum-shaped member 118 for the sun gear carrier 117, whereby part 130b thereof extends over a portion of drum-shaped member 118 on the outside thereof. Intermediate these two drum-shaped members 130b and 118 is disposed an engageable device in the form of a clutch generally designated by E by means of which the drive, i.e., the input shaft 122, may be selectively connected with the sun gear carrier 117, 116 and therewith with both sun gears 110 and 113. This clutch E again consists of the same structural elements as the engageable devices C and D described hereinabove. A hydraulic actuating piston 131 or an annular actuating member for the clutch E is disposed at a disk member 132 which extends radially inwardly and which may form the annular cylinder for the actuating piston 131 thereof.

The outer ring gear 112 of the planetary gear set A is operatively connected with another engageable device in the form of a single friction disk clutch generally designated by F over an L-shaped sleeve or drum-shaped member 133 supported on the driving shaft 122. The clutch F may be selectively actuated by means of a hydraulic piston 134 which is arranged within an annular cylinder formed by the disk 129. The clutch F serves for purposes of connecting the annular gear 112 with the driving or input shaft 122.

OPERATION

The operation of the transmission illustrated in FIGURE 2 is as follows:

First Speed

For purposes of achieving first speed, the single friction disk clutch F is engaged by actuation of the piston member 134 and the brake D is engaged by actuation of the piston member 128. As a result thereof, the drive shaft 122 is again operatively connected with the ring gear 112 of the planetary gear set A adjacent thereto and the planet carrier 123 of the second planetary gear set B is operatively connected with the transmission housing 126. The drive thereby takes place again from ring gear 112 to the planet gears 111 of the first planetary gear set A where a branching of the transmission of torque takes place. One path for the transmission of torque takes place over the planet carrier 119 of the first planetary gear set A directly to the driven shaft 120 whereas a second path for the transmission of torque takes place over sun gears 110 and 113, the planet gears 114 and the outer ring 115 of the second planetary gear set B and therewith to the driven shaft 120.

Second Speed

In second speed, the clutch F remains engaged. However, instead of the brake D, brake C is now engaged. As a result thereof, both sun gears 110 and 113 are braked, i.e., are held stationary against the transmission housing 126 so that the drive now takes place from the driving shaft 122 over the ring gear 112 and the planet gears 111 of the first planetary gear set A directly to the planet carrier 119 and therewith to the driven shaft 120. The second planetary gear set B thereby idles along.

Third Speed

In third speed, the clutch F also remains engaged and, additionally thereto, the clutch E is engaged. Both brakes C and D are disengaged. As a result thereof both planetary gear sets A and B are locked in themselves and rotate as a unit driven by the input shaft 122 at the same rotary speed as the shaft 122 thereby providing effectively a direct drive.

Reverse Speed

For purposes of obtaining reverse speed, both brake D and clutch E are simultaeously engaged while both brake C and clutch F are disengaged. As a result thereof, the drive takes place over the drum-shaped member 118, disk-like member 117, to the sun gear carrier 116 and therewith to the gun gear 113 of the second planetary set.

Since the planet carrier 123 of the second planetary gear set B is prevented from rotating by engagement of brake D, the outer ring gear 115 thereof is driven in the reverse direction. The first planetary gear set A thereby idles along.

In all three forward speeds, the clutch F remains always engaged and all three forward speeds are obtained exclusively by actuating the other three engageable devices. Only during the transition into reverse speed, two engageable devices have to be engaged simultaneously.

Figure 3:
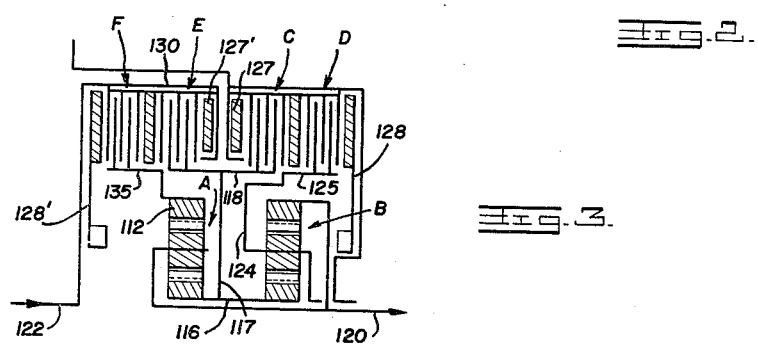
FIGURE 3 is a schematic view of another embodiment of a change-speed transmission illustrating another improved arrangement of the clutches and actuating members in accordance with the present invention.

FIGURE 3 shows a further modified embodiment of a transmission in accordance with the present invention which includes in principle the same construction as FIGURE 2. However, all four engageable devices C to F of this embodiment consist of identical structural elements. Ring gear 112 of the first planetary gear set A is also connected in this embodiment with a drum-shaped member 135 so that an approximately symmetrical overall construction of the transmission results therefrom. The clutches E and F are thereby disposed within the outer drum-shaped member 130 operatively connected with the drive shaft 122 which is constituted in this embodiment as a member formed integrally therewith.

Actuating pistons 127 and 128 are provided for engageable devices C and D. By reason of the fact that clutches E and F are constructed identically, similar pistons 127' and 128' may be used for the actuation thereof. The arrangement of the clutches is again mirror-image-like with respect to each other.

Furthermore, the operation of the transmission illustrated in FIGURE 3 is identical to that of FIGURE 2 or FIGURE 1 and the shifting operations necessary for effecting the various speeds thereof is also the same.

Possibly the input shaft and output shaft 10 or 122 and 19 or 120 may be interchanged with each other so that shaft 10 or 122 becomes the normal output shaft and shaft 19 or 120 the normal input shaft.

Moreover, the illustrated transmission may be combined with further transmissions into a larger transmission aggregate including a hydrodynamic device such as fluid coupling or torque converter.

Moreover, the individual clutuches 14 and 11 and brakes 23 and 26 as well as engageable devices C through F may be engaged manually or automatically, for example, in dependence on the engine output or torque transmitted, for instance, by the setting of the gas pedal or the vacuum in the intake manifold respectively.

The two planetary gear sets 13 and 22, or A and B, i.e., the individual gear elements thereof, may be made of different dimensions, especially for purposes of obtaining different transmission ratios, or may also be formed alike whereby, in the latter case, aside from a more economical manufacture and a lesser number of transmission parts to be kept as spare parts, a particularly favorable step-down transmission of the various forward speeds and of the reverse speed may be obtained.

While I have shown and described one preferred embodiment in accordance with the present invention, it is understood that the same is not limited thereto but is susceptible of many changes and modifications within the spirit of the present invention, and I, therefore, do not wish to be limited to the specific details shown and described herein but intend to cover all such changes and modifications as are encompassed by the appended claims.

I claim:

1. A compact change-speed transmission comprising input means, output means, a relatively stationary part, two planetary gear sets each including a sun gear, at least one planet gear with a planet carrier supporting thereon the respective planet gear, and a ring gear, each planet gear being in meshing engagement with a respective sun and ring gear, said two sun gears being operatively connected with each other to rotate in unison, a first drum-shaped member extending over at least part of one of said planetary gear sets radially outwardly thereof and forming a radially inner support for friction disk means, a first disk-like member operatively connecting said first drum-shaped member with the planet carrier of said one planetary gear set on the side thereof intermediate said two sun gears, a second drum-shaped member disposed radially outwardly of said first drum-shaped member and extending over at least part of each of said planetary gear sets and also over a portion of said first mentioned drum-shaped member, the opposite ends of said second drum-shaped member forming radially inner supports for friction disk means, said relatively stationary part being provided with radially outer supports for friction disk means opposite the radially inner support of said first drum-shaped member and opposite the radially inner support of the end of said second drum-shaped member extending over at least part of said one planetary gear set, means operatively connected with said input means and providing effectively third and fourth drum-shaped members each provided with a radially outer support for friction disk means, the third drum-shaped member extending over at least part of the other planetary gear set and being disposed with the radially outer friction disk support thereof radially outwardly and opposite the radially inner friction disk support on the end of said second drum-shaped member extending over at least part of said other planetary gear set, the friction disk supports of said first, second and third drum-shaped members being disposed essentially within the radially outward area corresponding to the axial dimension between opposite ends of said two planetary gear sets, means operatively connected with the ring gear of said other planetary gear set and effectively forming a radially inner support for friction disk means opposite the radially outer support of said fourth drum-shaped member, the planet carrier of said other planetary gear set and the ring gear of said one planetary gear set being operatively connected with said output means, and friction disk means with selective actuating means between the respective mutually opposite, radially inner and outer supports to provide, as viewed in the axial direction from said one to said other planetary gear sets, a first friction brake for the planet carrier of said one planetary gear, a second friction brake for said two sun gears, a first friction clutch between said sun gears and said input means, and a second friction clutch between the ring gear of said other planetary gear set and said input means.

2. A compact change-speed transmission according to claim 1, wherein said first and second friction brakes as well as at least said first friction clutch are disposed essentially along the same radial dimension adjacent one another.

3. A compact change-speed transmission according to claim 2, wherein said second friction clutch is also disposed essentially on the same radial dimension as said first friction clutch and said first and second friction brakes.

4. A compact change-speed transmission according to claim 1, wherein said first friction brake and said first friction clutch are of essentially identical mirror imagelike construction with the actuating means thereof disposed on opposite sides thereof.

5. A compact planetary-gear change-speed transmission, especially for motor vehicles, having a transmission housing, comprising two planetary gear sets, each gear set including a sun gear, a ring gear, a planet gear meshing with a respective sun and ring gear, and a planet carrier for said planet gear, the two sun gears being operatively connected together for rotation in unison, a first drum-shaped member concentrically surrounding said planetary gear sets for receiving disengageable friction-disk means operative as clutch and brake respectively, a disk-like member arranged between said two gear sets and operatively connecting said sun gears with said first drum-shaped member, transmission input means at one end and transmission output means at the other end of said transmission, said output means being operatively connected with the planet carrier of one planetary gear set and with the ring gear of the other planeary gear set, said first drum-shaped member extending axially to both sides of said disk-like member, first disengageable friction-disk means operative as disengageable clutch for disengageably connecting said sun gears with said input means including that one part of said first drum-shaped member disposed toward the input side of the transmission with respect to said disk-like member and a second drum-shaped member surrounding said first drum-shaped member to accommodate therebetween the friction disk means of said first disengageable friction-disk means, second disengageable friction disk means operative as brake for selectively braking said sun gears against said transmission housing including the other part of said first drum-shaped member disposed toward the output side of said transmission with respect to said disk-like member to accommodate thereon the friction disk means of said second disengageable friction disk means, a third drum-shaped member operatively connected with the planet carrier of said other planetary gear set, said third drum-shaped member being surrounded externally thereof over a portion of its length by the other part of said first drum-shaped member, third disengageable friction disk means operative as brake for braking the planet carrier of said other planetary gear set against said transmission housing including said third drum-shaped member for accommodating thereon the friction disk means of said third disengageable friction disk means, said second drum-shaped member being operatively connected with said input means, and fourth disengageable friction disk means operative as clutch for selectively connecting said input means with the ring gear of said one planetary gear set including a portion of said second drum-shaped member and a fourth drum-shaped member operatively connected with said last-mentioned ring gear for accommodating therebetween the friction disk means of said fourth disengageable friction disk means.

6. A compact planetary-gear change-speed transmission, especially for motor vehicles, having a transmission housing, comprising two planetary gear sets, each gear set including a sun gear, a ring gear, a planet gear meshing with a respective sun and ring gear, and a planet carrier for said planet gear, the two sun gears being operatively connected together for rotation in unison, a first drum-shaped member concentrically surrounding said planetary gear sets for receiving disengageable friction-disk means operative as clutch and brake respectively, a disk-like member arranged between said two gear sets and operatively connecting said sun gears with said first drum-shaped member, transmission input means at one end and transmission output means at the other end of said transmission, said output means being operatively connected with the planet carrier of one planetary gear set and with the ring gear of the other planetary gear set, said first drum-shaped member extending axially to both sides of said disk-like member, first disengageable friction-disk means operative as disengageable clutch for disengageably connecting said sun gears with said input means including that one part of said first drum-shaped member disposed toward the input side of the transmission with respect to said disk-like member and a second drum-shaped member surrounding said first drum-shaped member to accommodate therebetween the friction disk means of said first disengageable friction-disk means, second disengageable friction disk means operative as brake for selectively braking said sun gears against said transmission housing including the other part of said first drum-shaped member disposed toward the output side of said transmission with respect to said disk-like member to accommodate thereon the friction disk means of said second disengageable friction disk means, a third drum-shaped member operatively connected with the planet carrier of said other planetary gear set, said third drum-shaped member being surrounded externally thereof over a portion of its length by the other part of said first drum-shaped member, third disengageable friction disk means operative as brake for braking the planet carrier of said other planetary gear set against said transmission housing including said third drum-shaped member for accommodating thereon the friction disk means of said third disengageable friction disk means, said second disengageable friction disk means being arranged on the other portion of said first drum-shaped member mirror-image-like to said third disengageable friction disk means arranged on said third drum-shaped member, each of said second and third disengageable means being provided with counter-support means for the respective friction disk means thereof and said counter-support means directly abutting against one another, said second drum-shaped member being operatively connected with said input means, and fourth disengageable friction disk means operative as clutch for selectively connecting said input means with the ring gear of said one planetary gear set including a portion of said second drum-shaped member and a fourth drum-shaped member operatively connected with said last-mentioned ring gear for accommodating therebetween the friction disk means of said fourth disengageable friction disk means.

7. A compact planetary-gear change-speed transmission, especially for motor vehicles, having a transmission housing, comprising two planetary gear sets, each gear set including a sun gear, a ring gear, a planet gear meshing with a respective sun and ring gear, and a planet carrier for said planet gear, the two sun gears being operatively connected together for rotation in unison, a first drum-shaped member concentrically surrounding said planetary gear sets for receiving disengageable friction-disk means operative as clutch and brake respectively, a disk-like member arranged between said two gear sets and operatively connecting said sun gears with said first drum-shaped member, transmission input means at one end and transmission output means at the other end of said transmission, said output means being operatively connected with the planet carrier of one planetary gear set and with the ring gear of the other planetary gear set, said first drum-shaped member extending axially to both sides of said disk-like member, first disengageable friction-disk means operative as disengageable clutch for disengageably connecting said sun gears with said input means including that one part of said first drum-shaped member disposed toward the input side of the transmission with respect to said disk-like member and a second drum-shaped member surrounding said first drum-shaped member to accommodate therebetween the friction disk means of said first disengageable friction-disk means, second disengageable friction disk means operative as brake for selectively braking said sun gears against said transmission housing including the other part of said first drum-shaped member disposed toward the output side of said transmission with respect to said disk-like member to accommodate thereon the friction disk means of said second disengageable friction disk means, a third drum-shaped member operatively connected with the planet carrier of said other planetary gear set, said third drum-shaped member being surrounded externally thereof over a portion of its length by the other part of said first drum-shaped member, third disengageable friction disk means operative as brake for braking the planet carrier of said other planetary gear set against said transmission housing including said third drum-shaped member for accommodating thereon the friction disk means of said third disengageable friction disk means, said second drum-shaped member being operatively connected with said input means, and fourth disengageable friction disk means operative as clutch for selectively connecting said input means with the ring gear of said one planetary gear set including a portion of said second drum-shaped member and a fourth drum-shaped member operatively connected with said last-mentioned ring gear for accommodating therebetween the friction disk means of said fourth disengageable friction disk means, said second drum-shaped member being provided with essentially radially inwardly extending disk means approximately at half the length thereof, and said first and fourth disengageable friction disk means being arranged axially on opposite sides of said radially inwardly extending disk means within said second drum-shaped member.

8. A compact planetary-gear change-speed transmission according to claim 7, wherein said essentially radially inwardly extending disk means serves as abutment for said fourth disengageable friction disk means and is constructed within the inner area thereof simultaneously as annular cylinder for receiving therein the actuating piston for said first disengageable friction disk means.

9. A compact planetary-gear change-speed transmission according to claim 8, wherein said second drum-shaped member is operatively connected with said input means over a further disk member simultaneously constructed as annular cylinder for receiving the actuating piston of said fourth disengageable friction disk means.

10. A compact planetary-gear change-speed transmission accoding to claim 9, wherein said fourth drum-shaped member extends through said radially inwardly extending disk means, and means rotatably supporting said fourth drum-shaped member at a part rotating in unison with said input means.

11. A compact planetary-gear change-speed transmission according to claim 7, wherein said fourth disengageable friction disk means is a single friction disk clutch, and wherein said first, second and third disengageable means are of multi-friction-disk construction and are composed of identical structural elements.

12. A compact planetary-gear change-speed transmission, especially for motor vehicles, having a transmission housing, comprising two planetary gear sets, each gear set including a sun gear, a ring gear, a planet gear meshing with a respective sun and ring gear, and a planet carrier for said planet gear, the two sun gears being operatively connected together for rotation in unison, a first drum-shaped member concentrically surrounding said planetary gear sets for receiving disengageable friction-disk means operative as clutch and brake respectively, a disk-like member arranged between said two gear sets and operatively connecting said sun gears with said first drum-shaped member, transmission input means at one end and transmission output means at the other end of said transmission, said output means being operatively connected with the planet carrier of one planetary gear set and with the ring gear of the other planetary gear set, said first drum-shaped member extending axially to both sides of said disk-like member, first disengageable friction-disk means operative as disengageable clutch for disengageably connecting said sun gears with said input means including that one part of said first drum-shaped member disposed toward the input side of the transmission with respect to said disk-like member and a second drum-shaped member surrounding said first drum-shaped member to accommodate therebetween the friction disk means of said first disengageable friction-disk means, second disengageable friction disk means operative as brake for selectively braking said sun gears against said transmission housing including the other part of said first drum-shaped member disposed toward the output side of said transmission with respect to said disk-like member to accommodate thereon the friction disk means of said second disengageable friction disk means, a third drum-shaped member operatively connected with the planet carrier of said other planetary gear set, said third drum-shaped member being surrounded externally thereof over a portion of its length by the other part of said first drum-shaped member, third disengageable friction disk means operative as brake for braking the planet carrier of said other planetary gear set against said transmission housing including said third drum-shaped member for accommodating thereon the friction disk means of said third disengageable friction disk means, said second drum-shaped member being operatively connected with said input means, and fourth disengageable friction disk means operative as clutch for selectively connecting said input means with the ring gear of said one planetary gear set including a portion of said second drum-shaped member and a fourth drum-shaped member operatively connected with said last-mentioned ring gear for accommodating therebetween the friction disk means of said fourth disengageable friction disk means, said fourth disengageable friction disk means being a single friction disk clutch while the other disengageable means are of multi-friction disk construction, at least said last-mentioned other disengageable means being built up of essentially identical structural elements.

13. A change-speed transmission including a plurality of planetary gear sets, especially an automatically-shifted change-speed transmission for use with a hydrodynamic unit, comprising input means, output means, a relatively stationary part, two planetary gear sets each including at least one sun gear, at least one planet gear with a planet carrier for supporting thereon said planet gear, and a ring gear, each planet gear being in meshing engagement with a respective sun and ring gear, connecting means interconnecting the two sun gears, a drum-shaped member extending at least in part over said two planetary gear sets, disk-like means between said two gear sets operatively connecting said connecting means with said drum-shaped member, first and second engageable means disposed substantially radially outwardly from said two planetary gear sets cooperating with said drum-shaped member and operative to selectively connect said drum-shaped member and therewith said disk-like means and said two sun gears either with said input means or with said relatively stationary part, third engageable means for selectively connecting the ring gear of the planetary gear set adjacent said input means with said input means, and fourth engageable means disposed radially outwardly from said planetary gear set adjacent said output means for selectively connecting the planet carrier of the planetary gear set adjacent said output means with said relatively stationary part.

14. A change-speed transmission according to claim 13, wherein all engageable means are friction disk devices composed of identical structural parts.

15. A change-speed transmission according to claim 14, wherein all engageable means include identical actuating means.

16. A change-speed transmission according to claim 13, wherein said first, second and fourth engageable means are provided with identically constructed parts, and wherein said third engageable means is constructed as a single friction disk clutch and is of different construction from said first, second and fourth engageable means.

References Cited in the file of this patent

UNITED STATES PATENTS

| | | |
|---|---|---|
| 2,144,270 | Palmgren | Jan. 17, 1939 |
| 2,689,489 | Storer et al. | Sept. 21, 1954 |
| 2,813,437 | Kelbel et al. | Nov. 19, 1957 |
| 2,854,862 | Foerster | Oct. 7, 1958 |
| 2,856,794 | Simpson | Oct. 21, 1958 |
| 2,912,884 | Christenson et al. | Nov. 17, 1959 |
| 2,917,951 | Aschauer | Dec. 22, 1959 |
| 2,929,271 | Miller | Mar. 22, 1960 |